US010214618B2

(12) United States Patent
Adams et al.

(10) Patent No.: US 10,214,618 B2
(45) Date of Patent: Feb. 26, 2019

(54) LOW DENSITY CORING MATERIAL

(71) Applicant: Illinois Tool Works Inc., Glenview, IL (US)

(72) Inventors: Robert Mark Adams, Cincinnati, OH (US); Randall Lake, Independence, KY (US); Louis Paul Schaefer, Trinity, FL (US); Helena Twardowska, Cincinnati, OH (US); Brian Kruchten, Royalton, MN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/349,064

(22) Filed: Nov. 11, 2016

(65) Prior Publication Data

US 2017/0058084 A1  Mar. 2, 2017

Related U.S. Application Data

(62) Division of application No. 12/853,382, filed on Aug. 10, 2010, now Pat. No. 9,511,563.

(51) Int. Cl.
| | |
|---|---|
| *C08J 3/22* | (2006.01) |
| *B32B 5/22* | (2006.01) |
| *B32B 5/24* | (2006.01) |
| *B32B 5/26* | (2006.01) |
| *B01F 7/00* | (2006.01) |
| *B32B 5/16* | (2006.01) |
| *B32B 17/06* | (2006.01) |
| *B32B 27/14* | (2006.01) |
| *B32B 37/15* | (2006.01) |

(52) U.S. Cl.
CPC ............. *C08J 3/22* (2013.01); *B01F 7/00391* (2013.01); *B32B 5/16* (2013.01); *B32B 5/22* (2013.01); *B32B 5/24* (2013.01); *B32B 5/26* (2013.01); *B32B 17/068* (2013.01); *B32B 27/14* (2013.01); *B32B 37/15* (2013.01); *B32B 2250/05* (2013.01); *B32B 2250/20* (2013.01); *B32B 2250/24* (2013.01); *B32B 2250/244* (2013.01); *B32B 2260/021* (2013.01); *B32B 2260/023* (2013.01); *B32B 2260/046* (2013.01); *B32B 2262/101* (2013.01); *B32B 2264/02* (2013.01); *B32B 2264/101* (2013.01); *B32B 2307/72* (2013.01); *B32B 2605/00* (2013.01); *B32B 2605/08* (2013.01); *B32B 2605/12* (2013.01); *B32B 2605/16* (2013.01); *C08J 2367/00* (2013.01); *Y10T 428/249971* (2015.04)

(58) Field of Classification Search
CPC ..... C08K 7/22; C08K 7/24; C08K 7/28; C08J 3/22; B32B 5/16; B32B 5/22; B32B 5/24; B32B 5/26; B32B 17/068
See application file for complete search history.

(56) References Cited

U.S. PATENT DOCUMENTS

| | | | |
|---|---|---|---|
| 5,372,763 | A | 12/1994 | Hordis |
| 6,463,871 | B1 | 10/2002 | Anderson et al. |
| 2001/0008687 | A1 | 7/2001 | Kollaja et al. |
| 2002/0137411 | A1 | 9/2002 | Capra |
| 2004/0033347 | A1 | 2/2004 | Lauersdorf et al. |
| 2004/0038059 | A1 | 2/2004 | Kia et al. |
| 2004/0170850 | A1 | 9/2004 | Nava |
| 2005/0261464 | A1 | 11/2005 | Schorr |
| 2007/0042170 | A1 | 2/2007 | Morin |
| 2008/0090060 | A1 | 4/2008 | Kia et al. |
| 2009/0065737 | A1 | 3/2009 | Wells et al. |
| 2009/0302505 | A1 | 12/2009 | Kruchten et al. |
| 2010/0003506 | A1 | 1/2010 | Desai et al. |

FOREIGN PATENT DOCUMENTS

| | | |
|---|---|---|
| EP | 1391289 A2 | 2/2004 |
| WO | 2006138140 A2 | 12/2006 |

OTHER PUBLICATIONS http://www.netcomposites.com/guide/polyester-resins/8 (2015).
Office Action issued by the Canadian Patent Office for related Canadian Patent Application No. 2,805,287, dated Jul. 9, 2014.
Office Action issued by the Canadian Patent Office for related Canadian Patent Application No. 2008/0090060, dated Sep. 16, 2013.
International Search Report and Written Opinion of the International Searching Authority pertaining to the International Application No. PCT/US2011/052245, dated Mar. 13, 2012.
International Search Report and Written Opinion of the International Searching Authority pertaining to the International Application No. PCT/US2011/047092, dated Oct. 10, 2011.
ITW SprayCore: "ITWSprayCore Product Guide," Internet Citation, Jan. 1, 2004, pp. 1-4. (retrieved Sep. 27, 2011).
SprayCore 2000-OS LC: "Material Safety Data Sheet/SprayCore 2000-OS LS;" Internet Citation, Oct. 27, 2005, pp. 1-7 (retrieved Sep. 27, 2011).
Melber et al., "Organic Microspheres for Supertough Syntactic Foams," Plastics Compounding, Advanstar Communications, Inc. Santa Ana, CA, vol. 7, No. 2, Mar. 1, 1984, pp. 19-20, 22, 24.
Cravens, Thomas E., "Saran Microspheres in Polyester Resins," papers presented at the meetings—American Chemical Society, Division of Organic Coatings and Plastics Chemistry, American Chemical Society, Washington, DC, vol. 33, Aug. 26, 1973, pp. 74-79.
Cravens, Thomas E., "Syntactic Foams Utilizing Saran Microspheres," Journal of Cellular Plastics, Sage Publications, London, GB, vol. 9, No. 6, Nov. 1, 1973, pp. 260-267.

(Continued)

*Primary Examiner* — Edward J Cain
(74) *Attorney, Agent, or Firm* — Avery N. Goldstein; Blue Filament Law PLLC

(57) ABSTRACT

A low density coring material is described. In one embodiment, the low density coring material consists essentially of: about 40 to about 80 wt % resin; 0 to about 50 wt % monomer; 0 to about 5 wt % dispersion aid; 0 to about 5 wt % accelerator; about 3 to about 7 wt % microspheres; and about 1 to about 5 wt % catalyst; wherein a density of the cured coring material is less than about 5.0 lbs/gal. Composites made using the low density coring material and methods of making composites are also described.

15 Claims, 2 Drawing Sheets

(56) References Cited

OTHER PUBLICATIONS

Clark, Rich, "The Use of Polymeric Microspheres in Fiberglass Reinforced Plastics", Pierce & Stevens Corporation, Composites 2000, Sep. 28, 2000, 7 pages.

Twardowska, Helena et al., "High Strength Low Density Structural SMC Formulations", Ashland Specialty Chemical Co., Composites 2005 Convention and Trade Show, American Composites Manufacturers Association, Sep. 28-30, 2005, Columbus, Ohio, USA, 5 pages.

LOW DENSITY CORING MATERIAL

RELATED APPLICATIONS

This application is a divisional application of U.S. Utility patent application Ser. No. 12/853,382 filed 10 Aug. 2010; the contents of which are hereby incorporated by reference.

FIELD OF THE INVENTION

This invention relates to a lightweight, polymer based coring material that can be used to replace higher density materials in composite manufacturing.

BACKGROUND OF THE INVENTION

Composite materials such as fiberglass reinforced plastic (FRP) are used in a variety of applications, including marine, transportation, energy, and construction. As one illustrative example, an FRP composite 10 for a marine application has a structure as illustrated in FIG. 1. There is a gelcoat layer 15 followed by 1 layer with 1.0 oz. resin/glass 20. Next come 4 layers with 1.5 oz. resin/glass 25. They are followed by 1 layer with 1.0 oz. resin/glass 30 and a wood, foam, or honeycomb reinforcement layer 35. This composite contains about 8 oz. of resin/glass, which gives the composite good strength.

However, it would be desirable to reduce the weight of the composite for some applications. It would also be desirable to maintain the properties at the same level or to only have a slight reduction in properties.

Attempts have been made to utilize alternative materials in FRP composites. For example, lightweight materials such as balsa and COREMAT®. have been tried. However, these materials require much more time to utilize. In addition, they are more expensive to use because of the very high resin demand. Furthermore, they cannot be used in all laminate structures due to the difficulty of hand laying them in small radius areas. Other low density materials do not provide sufficient weight reduction.

Therefore, there is a need for a material which allows the weight of a composite to be reduced.

SUMMARY OF THE INVENTION

The present invention meets this need. One aspect of the invention is a low density coring material. In one embodiment, the low density coring material consists essentially of: about 40 to about 80 wt % resin; 0 to about 50 wt % monomer; 0 to about 5 wt % dispersion aid; 0 to about 5 wt % accelerator; about 3 to about 7 wt % microspheres; and about 1 to about 5 wt % catalyst; wherein a density of the cured coring material is less than about 5.0 lbs/gal.

Another aspect of the invention is a composite. In one embodiment, the composite includes a first layer of resin/glass; a layer of low density coring material adjacent to the first layer of resin/glass, the coring material consisting essentially of: about 40 to about 80 wt % resin; 0 to about 50 wt % monomer; 0 to about 5 wt % dispersion aid; 0 to about 5 wt % accelerator; about 3 to about 7 wt % microspheres; and about 1 to about 5 wt % catalyst; wherein a density of the cured coring material is less than about 5.0 lbs/gal; and a second layer of resin/glass or a bulk layer.

Another aspect of the invention is a method of making a composite. In one embodiment, the method includes depositing a first layer of resin/glass; at least partially curing the first layer; depositing a layer of low density coring material adjacent to the at least partially cured first layer, the coring material consisting essentially of: about 40 to about 80 wt % resin; 0 to about 50 wt % monomer; 0 to about 5 wt % dispersion aid; 0 to about 5 wt % accelerator; about 3 to about 7 wt % microspheres; and about 1 to about 5 wt % catalyst; at least partially curing the layer of coring material; and depositing a second layer of resin/glass or a bulk layer adjacent to the layer of at least partially cured coring material.

DETAILED DESCRIPTION OF THE INVENTION

The present invention relates to a very lightweight, polymer based coring material that can be used to replace higher density materials used in composite manufacturing. A composite made using the low density coring material can have a density about 10 to about 50% lighter than normal composite while retaining or improving the physical properties of normal composites. It allows reduced cycle time to manufacture the composite. It can also reduce the construction needed to produce open molding laminate structure. The low density coring material can be sprayed using available spray equipment, or it can be applied by hand.

The low density coring material has a very low cured density of less than about 5.0 lbs/gal, or about 2.8 to about 5.0 lbs/gal, or about 2.8 to about 4.5 lbs/gal, or about 2.8 to about 4.0 lbs/gal, or about 2.8 to about 3.5 lbs/gal. It provides high flexural strength, e.g., the flexural strength can be equal to or higher than a part made with standard polyester FRP. In some applications, it would be acceptable for the flexural strength to be slightly less than a part made with standard polyester FRP. It can improve productivity compared to traditional FRP. It provides high build, for example, there is no sag up to 750 mils in one pass.

Figure 1:
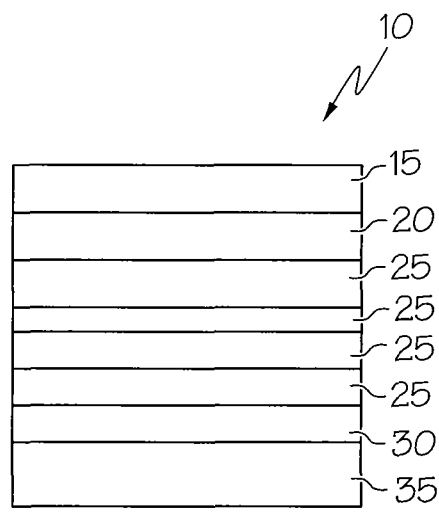
FIG. 1 is an illustration of a prior art composite.
Figure 2:
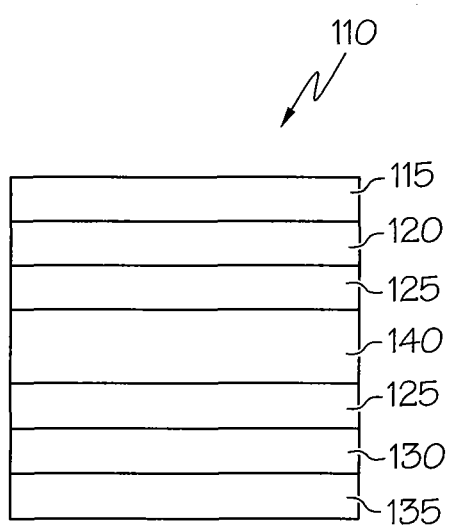
FIG. 2 is an illustration of one embodiment of a composite made according to the present invention.

FIG. 2 illustrates an example of a composite structure 110 made using the low density coring material. There is a gelcoat layer 115 and 1 layer with 1.0 oz. resin/glass 120 followed by 1 layer with 1.5 oz. resin/glass 125. This is followed by a layer of the low density sprayable material 140. This is followed by 1 layer with 1.5 oz. resin/glass 125 and 1 layer with 1.0 oz. resin/glass 130. The wood, foam, or honeycomb reinforcement layer 135 is last.

The low density coring material typically contains: about 40 to about 80 wt % resin, or about 65 to about 75 wt %, or about 68 wt %; 0 to about 50 wt % monomer, or about 20 to about 25 wt %, or about 24 wt %; 0 to about 5 wt % dispersion aid, or about 0.5 to about 0.8 wt %, or about 0.7 wt %; 0 to about 5 wt % accelerators, or about 0.05 to about 0.1 wt %, or about 0.08 wt %; about 3 to about 7 wt % microspheres; or about 3.8 to about 4.8 wt %, or about 4.3 wt %; and about 1 to about 5 wt % catalyst, or about 2.5 to about 3.5 wt %, or about 3.0 wt %.

Figure 3:
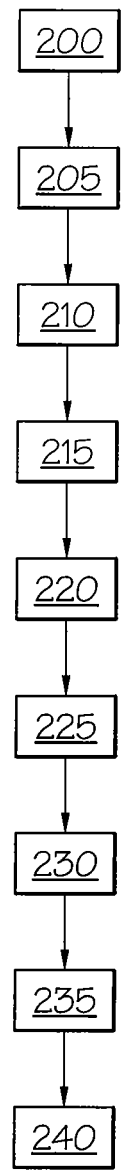
FIG. 3 is a flow chart showing one embodiment of a method of making the low density coring material.

FIG. 3 illustrates a method of making the low density coring material. One or more resins are provided at block 200. Typically, about 40 to about 80 wt % of the composition is a polyester resin. Suitable resins can be obtained from Reichhold Chemical, for example. The monomer (if used) is provided at block 205. The monomer is typically 0 to about 50 wt % of the composition. Suitable monomers include, but are not limited to, styrene monomers.

A dispersion aid (0-5 wt %) can be added at block 210. The resin, monomer, and dispersion aid are mixed at block 215. The mixer can have a low shear helix blade and a high shear blade, if desired. The components mix readily. For example, suitable mixing can be obtained by initially mixing at low speed (e.g., about 20 rpm) with the helix blade, then at high speed (e.g., about 1100-1200 rpm) using the high shear blade.

One or more accelerators can be added at block 220. Suitable accelerators include, but are not limited to, DMPT, DMA, DMAA, cobalt octoate, potassium octoate, copper napthanate and quaternary ammonium salts. The accelerators generally comprise 0 to about 5 wt % of the composition. The accelerators are mixed with the resin mixture for about 5 minutes with the helix blade at low speed (about 30 rpm) and with the high shear blade at high speed (1200-1300 rpm).

The high shear blade is turned off, the helix blade is put at a low speed (about 2-3 rpm), and the microspheres are added at block 230. The microspheres are included to reduce the density of the material. Glass or plastic microspheres can be used. When the low density coring material is to be applied by spraying, it is desirable to use plastic microspheres so that they do not break during the spraying process.

The microspheres are typically present in an amount of about 3 to about 7 wt %. If the level is above about 7 wt %, it is difficult to obtain a homogeneous mixture. When the mixture is sprayed or applied by hand, the layer has clumps and is not smooth, which affects the integrity and strength of the layer. If the level is less than about 3 wt %, the weight is not reduced below about 5 lbs/gal, and there is no advantage to the material.

The low density coring material is then mixed with the helix blade (e.g., about 20 rpm) and no shear for 30 min at block 235, and filtered through a mesh filter at block 240.

The low density coring material should have a gel time of about 7 to about 10 min (25.0 g. coring material with 0.75 g. MEKP 925 (1.0% vol/vol), mix for 20 sec). The viscosity should be about 7,000 to about 13,000 cps (RVT w/heliopath adapter, T-C @ 20 rpm measured with a Brookfield viscometer), or about 7,000 to about 10,000 cps. The thixatropic index should be about 1.5-7.0 cps (RVT w/heliopath adapter, T-C @ 2.5/20 rpm) The weight per gallon (WPG) should be less than about 5.0 lbs/gal, and the % non-volatiles should be 45.0-55.0.

Figure 4:
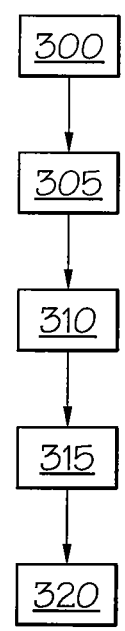
FIG. 4 is a flow chart showing one embodiment of a method of making a composite using the low density coring material.

A composite can be made using the method illustrated in FIG. 4. A layer of resin/glass is deposited at block 300. The layer of resin/glass can be sprayed on or applied by hand. The glass content of this layer of resin/glass should be about 30 to about 40%, or about 37%. If the glass content is lower than about 30%, the physical properties of the composite will be reduced, and the weight/ft.sup.2 will increase and affect the weight per part savings. If the glass content is above about 40%, lower glass shear could result. The minimum final weight of the layer can be about 1.5 oz, although it could be higher if needed for strength. The lower the weight of the resin/glass layers, the lower the weight of the overall composite.

The catalyst for the resin/glass layer should be present in an amount of about 1% by volume. The catalyst % may vary depending on the temperature and cure of the resin used.

The first layer should be at least partially cured when the low density coring material is applied. It is desirably cured until it is gelled firm to the point that the first layer does not move and is in the tack stage. The low density coring material should be applied prior to the first layer reaching a tack-free state to avoid delamination problems. The time to reach the gelled firm/tack stage will vary depending on the temperature, formulation, and cure of the resin used in the first layer.

The surface of the first layer should be checked at block 305. It should be inspected for air voids, and any dry glass fibers, dust, and other particles should be removed.

The layer of low density coring material is applied at block 310. The viscosity of the low density coring material should be in the range of about 7,000 to about 13,000 cps, and the density should be less than about 5.0 lbs/gal. The gel time should be about 7 to about 12 min or about 7 to about 10 min for a 100 g mass. The typical layer thickness is more than about 60 mils.

The catalyst for the low density coring material is typically MEKP (methyl ethyl ketone peroxide) at a level of about 1.0 to about 5.0 wt %, or about 2.5 to about 3.5 wt %. The catalyst is added in the application equipment when spraying, and it is mixed in before application when being applied by hand.

The low density coring material can be sprayed or applied by hand if desired. When spray applied, the thickness of the layer of low density coring material should be checked after each pass. The typical (wet) thickness per pass is about 15 to about 40 mils. If the dry thickness of 80 to 96 mils is not reached after two passes, a third pass should be sprayed, and the thickness checked again. The spraying should be continued until the desired thickness is obtained.

The low density coring material should be at least partially cured when the next layer is applied. It is desirably cured for at least about 20 min or more. The surface cure of the low density coring material can be checked before applying a resin/glass layer. A durometer reading of 35 will typically be obtained within about 45 min. (A scale model (307) Type L durometer) at 70° F. and will provide good strength. The durometer build will vary with temperatures above or below 70° F. and with humidity.

The surface of the low density coring material should be checked at block 315. Any rough spots or lumps should be removed to avoid second layer blisters, and any dust or other particles should be removed.

The bulk layer (the support material, e.g., wood, foam, or honeycomb) or a second (or more) resin/glass layer should then be applied at block 320. The bulk layer should generally be applied to the low density coring material after it has returned to ambient temperature and within 3 hrs of application. The characteristics of the additional resin/glass layer(s) could be similar to those for the first resin/glass layer or they could be different.

One of skill in the art will recognize that additional layers can be included before or after those described above. For example, there can be a gelcoat, and/or a barrier coat before the first resin/glass layer. There can be one or more resin/glass layers before the low density coring material, and one or more resin/glass layers after the low density coring material. There can be a bulk layer after one or more resin/glass layers or the bulk layer can directly follow the low density coring material.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A process for making a composition for a low density coring material comprising:
   providing one or more resins, a monomer, and a dispersion aid;
   performing a first mixing of the one or more resins, the monomer, and the dispersion aid with a mixer to form a resin mixture;
   adding one or more accelerators into the resin mixture;
   performing a second mixing of the added one or more accelerators and the resin mixture;
   adding microspheres to the mixture of the one or more accelerators and the resin mixture while performing a third mixing; and
   performing a fourth mixing and filtering the composition through a mesh to yield the low density coring material, the coring material having a cured state and an uncured state, the viscosity of the coring material in the uncured state is in a range of from 7,000 to 13,000 cps, wherein a density of the cured coring material is less than about 5.0 lbs/gal, a layer of low density coring material having a wet thickness from 15 to 40 mils per pass.

2. The process of claim 1 wherein said one or more resins are present from 40 to 80 wt % of the composition.

3. The process of claim 1 wherein said one or more resins is a polyester resin.

4. The process of claim 1 wherein said monomer is present up to 50 wt % of the composition.

5. The process of claim 1 wherein said monomer is a styrene monomer.

6. The process of claim 1 wherein the dispersion aid is present up to 50 wt % of the composition.

7. The process of claim 1 wherein the first mixing further comprises by initially mixing at low speed of about 20 rpm with a helix blade, and then mixing at high speed of 1100-1200 revolutions per minute (rpm) using a high shear blade.

8. The process of claim 1 wherein said one or more accelerators comprise at least one of dimethyl-p-toluidine (DMPT), dimethylaniline (DMA), 1,3-dimethylamylamine (DMAA), cobalt octoate, potassium octoate, copper napthanate and quaternary ammonium salts.

9. The process of claim 1 wherein said one or more accelerators are present up to 5 wt % of the composition.

10. The process of claim 1 wherein the second mixing further comprises mixing the accelerators are with the resin mixture for about 5 minutes with a helix blade at low speed of 30 rpm and with a high shear blade at high speed of from 1200 to 1300 rpm.

11. The process of claim 1 wherein the third mixing further comprises mixing with a helix blade at a low speed of from 2 to 3 rpm.

12. The process of claim 1 wherein the microspheres are glass or plastic.

13. The process of claim 1 wherein the microspheres are 3 to 7 wt % of the composition.

14. The process of claim 1 wherein the fourth mixing further comprises mixing with a helix blade at about 20 rpm and no shear for about 30 minutes.

15. The process of claim 1 wherein the density of a layer of the cured coring material is in a range of from 2.8 to 4.0 lbs/gal.

* * * * *